United States Patent Office 2,939,555
Patented June 7, 1960

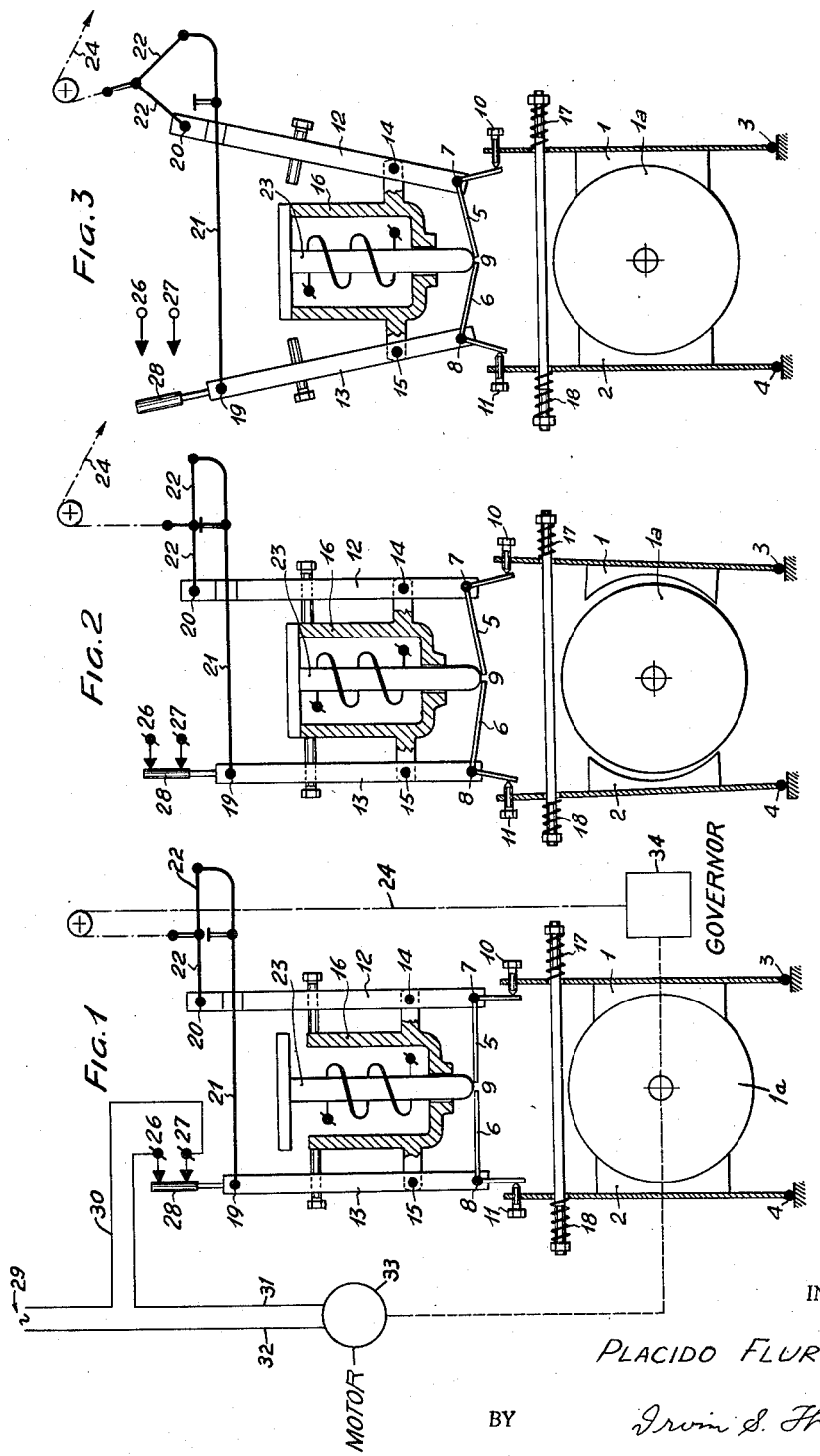

2,939,555

BRAKE FOR ELEVATORS

Placido Flury, Viale Volta 39, Novara, Italy

Filed Apr. 10, 1957, Ser. No. 652,061

Claims priority, application Italy Apr. 11, 1956

2 Claims. (Cl. 192—2)

The present invention relates to elevators and more particularly to a mechanical arrangement for the actuation of the electromagnetic brake in a hoisting machine for passenger and freight elevators in case of overspeeding of the car.

In hoisting machines for passenger and freight elevators and the like, it is known to release brakes by an electromagnet, although there are also known instances where small motors known as servobrakes (thrusters) are employed.

In both cases, the application of the brake bringing about the true and proper braking effect is caused by the de-energizing of such magnets or thrusters.

The braking effect on the hoisting machine is obtained by means of the pressure of oppositely acting springs. When electromagnets are used for releasing the brake, the practice most generally followed is that of multiplying the thrust by means of suitable lever systems, and this is done in order to reduce the size, weight and cost of the electromagnets.

As a consequence, any seizure of the movable parts of said magnet may have the unwanted result of keeping the brake released in spite of the cutting off of the electric current supply to the exciting winding of the electromagnet.

In the hoisting machines for passenger and freight elevators the inconvenience of a defective operation of the brake becomes more and more dangerous as the speed of the car is increased, since by reducing the transmission ratio of the gear transmission incorporated in the hoisting machine, there is also reduced the selfbraking action between the worm and the worm wheel of the reducing gear transmission.

When use is made of a hoisting machine of the type with direct traction, it is highly desirable to provide protection against the consequence of a seizure in the movable parts of the brake electromagnet.

It is the object of the present invention to provide a mechanical arrangement capable of bringing about the application of the brake in a hoisting machine for passenger or freight elevators, independently of the fact that, at the time of said application, the brake electromagnet is or is not effective.

The device in question is caused to operate only when, under the effect of an overspeeding or of a too high speed of the car, the so called speed governor intervenes.

The accompanying drawing illustrates diagrammatically, by way of example, the structure and the operation of an embodiment of the device according to the present invention. In the drawings:

Fig. 1 illustrates diagrammatically a brake combined with the electromagnetic device which is the object of the present invention, the brake and the other members being shown in their normal position with the brake applied.

Fig. 2 illustrates the same device as in Fig. 1, except that the parts are shown in the position of the brake normally released.

Fig. 3 illustrates the same device as the preceding figures, however with the different parts in the positions they take up when the brake is being applied through the intervention of the speed governor.

In this example, which has only an illustrating and nonlimiting purpose, there is used a friction brake having two shoes 1 and 2, which are hinged at 3 and 4 on the base of the hoisting machine, which in this example is of the type with gear transmission.

The multiplying levers 5 and 6 are hinged at the points 7 and 8 and receive at their ends 9 the thrust of the releasing magnet, this thrust being transmitted through the adjusting screws 10 and 11 to the shoes 1 and 2 of the brake.

Points 7 and 8 are not fast with the base of the machine but are carried on two levers 12 and 13 which, in the example as shown, are first class levers hinged at 14 and 15 on the stationary portion 16 of the magnet, which in turn is fast with the base of the hoisting machine.

The shoes 1, 2 act on the drum 1a of the brake, towards which they are pushed by the springs 17 and 18.

From the above it is apparent that the two hinge points 7 and 8 are stressed to come closer together by two forces generated by the springs 17 and 18.

On the contrary, the points 19 and 20 are stressed to move away from each other, and are restrained by the link 21, together with the system of toggle-joint levers 22, the system 22 being locked somewhat beyond its dead center, as schematically shown in Figures 1 and 2.

As long as the toggle-joint lever system 22 restrains the levers 12 and 13, to all effects the hinge points 7 and 8 act as if they are fast with the base of the machine.

The movable plunger 23 of the electromagnet causes releasing of the brake. The brake is shown applied in Fig. 1 and released in Fig. 2.

As already mentioned, the application of the brake is brought about by means of the springs 17 and 18 which push the braking shoes 1 and 2 against the brake drum 1a and raise the plunger 23 through the intermediary of the levers 5 and 6.

The condition is quite different when the speed governor device 34 acts due to an overspeeding of the car. Indeed, following the intervention of the speed governor device 34, that has to be suitably adjusted so as to cause a pull on actuation member 24, the toggle-joint lever system 22 is forced to relinquish its normal position as illustrated in Figures 1 and 2, and thus the link 21 no longer restrains the levers 12 and 13 and the hinge points 19 and 20 can move apart, while the points 7 and 8 move closer together.

Therefore, in case of a seizure in the brake magnet, the levers 5 and 6, finding no resistance in the hinge points 7 and 8, are no longer in a position to keep the brake shoes 1 and 2 released, which clamp the brake drum 1a under the action of the springs 17 and 18, thus stopping the hoisting machine.

Such a particular braking condition is represented in Fig. 3.

An electric contact, constituted for instance by the terminals 26 and 27 and the bridging contact 28, controls the levers 12 and 13 in their correct normal operating position.

As shown in Fig. 1, one side of a power source 29 is connected by lead 30 to contact 27. A lead 31 is connected to contact 26 and one side of an electric motor 33, and the other side of motor 33 is connected by lead 32 to the other side of the power source 29. The motor 33 drives the brake drum 1a and hoisting mechanism (not shown). A speed governor device 34, such as that shown in the patent to Hill, No. 1,039,284, is driven by drum 1a. The actuation member 24, which could be a rope, is connected between the speed governor device 34 and the toggle linkage 22, The breaking of the contact serves to cut off the power source 29 for the actuation of the installation and prevents the elevator from being again operated if the levers 12 and 13 have not been brought back to their normal position.

The actuation member 24 which couples the mechanical intervention device of the brake with the speed governor device 34 may have substituted for it any other suitable transmission member or arrangement capable of removing the stretched condition of the lever system 22 following an intervention by the speed governor.

The present invention does not limit its advantages and its application to the case of shoe type brakes but may also be applied to disc type brakes and the like.

What I claim is:

1. In an electromagnetically actuated brake for an elevator having a drum, brake shoe means, resilient means urging the brake shoe means into braking engagement with the drum, electromagnetic means for shifting the brake shoe means out of braking engagement with the drum, including a plunger, a pair of pivotally mounted multiplying levers engaging the plunger and brake shoe means for transmitting movement of the plunger to the brake shoe means, the combination comprising first and second levers pivotally mounted intermediate their ends on fixed pivots, one of said multiplying levers being pivotally mounted on one end of the first lever and the other multiplying lever being pivotally mounted on one end of the second lever, a control link connected at one end to the other end of the first lever and having its other end extending beyond the other end of the second lever, a toggle linkage including a pair of toggle links connected together at adjacent ends, one of said toggle links having its other end connected to the other end of the second lever, and the other toggle link having its other end connected to the end of the control link, whereby said toggle linkage in operative position will retain said levers in fixed position to enable the multiplying levers to shift the brake shoe means away from the drum, and when the toggle linkage is shifted to inoperative position will shift the levers to a position to disable the multiplying levers, and means responsive to excessive speed of the drum for shifting the toggle linkage to inoperative position.

2. A combination according to claim 1 in which the drum is driven by a power source, and means for controlling the power source is provided, said control means including electric contact means and means carried by one of the levers operable for closing the contact when the toggle linkage is in operative position and operable for opening the contacts when the toggle linkage is in inoperative position.

References Cited in the file of this patent

UNITED STATES PATENTS

| | | |
|---|---|---|
| 596,514 | Ihlder | Jan. 4, 1898 |
| 1,039,284 | Hill | Sept. 24, 1912 |
| 1,902,640 | Halfvarson | Mar. 21, 1933 |
| 2,424,333 | Santini et al. | July 22, 1947 |

FOREIGN PATENTS

| | | |
|---|---|---|
| 393,230 | France | Oct. 20, 1908 |
| 1,073,063 | France | Mar. 17, 1954 |
| 194,304 | Germany | Jan. 17, 1908 |
| 138,092 | Switzerland | Apr. 16, 1930 |